US009030058B2

(12) United States Patent
Furuichi et al.

(10) Patent No.: US 9,030,058 B2
(45) Date of Patent: *May 12, 2015

(54) VIBRATION GENERATOR

(71) Applicant: Nidec Seimitsu Corporation, Ueda-shi, Nagano-ken (JP)

(72) Inventors: Keisuke Furuichi, Ueda (JP); Tomohiro Akanuma, Ueda (JP)

(73) Assignee: Nidec Seimitsu Corporation, Ueda-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,956

(22) Filed: Mar. 11, 2013

(65) Prior Publication Data

US 2013/0278084 A1 Oct. 24, 2013

(30) Foreign Application Priority Data

Apr. 20, 2012 (JP) ................................. 2012-096772

(51) Int. Cl.
*H02K 33/00* (2006.01)
*H02K 33/16* (2006.01)

(52) U.S. Cl.
CPC ................ *H02K 33/00* (2013.01); *H02K 33/16* (2013.01)

(58) Field of Classification Search
USPC .............................. 310/14, 15, 20, 25, 36, 81
IPC ........................................................ H02K 33/00
See application file for complete search history.

(56) References Cited

U.S. PATENT DOCUMENTS

| 5,682,132 | A | 10/1997 | Hiroyoshi et al. |
| 5,894,263 | A * | 4/1999 | Shimakawa et al. ....... 340/388.1 |
| 6,702,466 | B2 * | 3/2004 | Ishikawa et al. .............. 384/112 |
| 6,777,895 | B2 * | 8/2004 | Shimoda et al. .............. 318/114 |
| 2003/0117223 | A1 | 6/2003 | Shimoda et al. |
| 2011/0018369 | A1 | 1/2011 | So |

FOREIGN PATENT DOCUMENTS

| AU | 2002-348669 A1 | 6/2003 |
| CN | 101964566 A | 2/2011 |
| JP | 9-117721 A | 5/1997 |
| JP | 2003-93968 A | 4/2003 |
| JP | 2003-154314 A | 5/2003 |
| JP | 2011-025221 A | 2/2011 |
| KR | 10-2011-0010408 A | 2/2011 |
| WO | 03/044938 A1 | 5/2003 |

\* cited by examiner

*Primary Examiner* — Dang Le
(74) *Attorney, Agent, or Firm* — Westerman, Hattori, Daniels & Adrian, LLP

(57) ABSTRACT

A vibration generator includes a coil, a vibrating body, a spring, and a shaft. The coil is arranged to generate magnetic fields. The vibrating body includes a magnet and a weight. The vibrating body is arranged to be vibrated in a thrust direction by an interaction of magnetic fields generated from the magnet and magnetic fields generated from the coil. The spring is arranged to support the vibrating body at one thrust-direction side of the vibrating body. The shaft is extended in the thrust direction through the vibrating body. The shaft is arranged to allow the vibrating body to slide along the shaft in the thrust direction.

8 Claims, 7 Drawing Sheets

VIBRATION GENERATOR

BACKGROUND OF THE INVENTION

1. Field of the Invention

The present invention relates to a vibration generator. In the vibration generator of the present invention, a coil and a magnet are arranged along a radial direction. A vibrating body is vibrated in a thrust direction by an interaction between the coil and the magnet.

2. Description of the Related Art

A portable terminal such as a cellular phone or the like includes a vibration generator arranged therein. The vibration generator generates vibration to thereby notify a user of arrival of an incoming call. Different types of vibration generators are available. As one example, there is available a vibration generator in which a vibrating body is vibrated in a thrust direction by an interaction of magnetic fields generated by a coil and a magnet. There have heretofore been proposed various kinds of vibration generators in which a vibrating body is vibrated in a thrust direction.

Japanese Patent Application Publication No. 9-117721 discloses a vibration generator including a vibrating body formed of a weight and a permanent magnet, springs for holding the vibrating body, a drive coil for continuously reciprocating the vibrating body at or near a resonance frequency, a means for supplying an electric signal to the drive coil and a means for transferring the vibration of the vibrating body to the outside via the spring. In this vibration generator, the vibrating body is held by the springs at the thrust-direction opposite sides of the vibrating body.

Japanese Patent Application Publication No. 2011-25221 discloses a vibration generator including: a case defining an internal space; a bracket arranged below the case to support a coil for inducing magnetic fields with an electric current flowing therethrough; a vibrating body having a yoke, a magnet accommodated within the yoke and a weight arranged outside the yoke; and a spring arranged in the upper portion of the case to support the vibrating body. In this vibration generator, a plurality of recess portions is formed on the outer surface of the weight. Rolling members are inserted into the recess portions. The rolling members rotate in contact with the sidewall of the case. In this vibration generator, the deflection of the vibrating body is prevented because the rolling members provided in the weight roll on the side surface of the case as the vibrating body is moved along the side surface of the case.

In the vibration generator disclosed in Japanese Patent Application Publication No. 9-117721, however, regions for arrangement of the springs need to be provided at the thrust-direction opposite sides of the vibrating body. For that reason, the vibration stroke of the weight serving as the vibrating body is small. This makes it impossible for the vibration generator to sufficiently generate vibration. Moreover, the structure in which the springs are installed at the thrust-direction opposite sides of the vibrating body becomes an obstacle in reducing the size of the vibration generator. It is difficult to assemble the structure in which the springs are installed at the thrust-direction opposite sides of the weight. In general, a method of filling a viscous fluid into a vibration generator is used as one of methods for stopping a weight within a short period of time. However, the method of filling the viscous fluid into the vibration generator cannot prevent leakage of the viscous fluid unless the fluid-tightness of a housing serving as an outer shell of the vibration generator is kept high.

In the vibration generator disclosed in Japanese Patent Application Publication No. 2011-25221, the rolling members need to smoothly roll along the side surface of the case. For that reason, the recess portions of the weight, the rolling members and the side surface of the case need to be machined with a high degree of accuracy. The high-accuracy machining tends to impede cost saving.

SUMMARY OF THE INVENTION

The present invention provides a vibration generator capable of cost-effectively preventing deflection of a vibrating body without impeding the reduction of a size of the vibration generator and capable of stopping the vibrating body within a short period of time.

In accordance with an aspect of the present invention, there is provided a vibration generator including: a coil arranged to generate magnetic fields; a vibrating body including a magnet and a weight, the vibrating body arranged to be vibrated in a thrust direction by an interaction of magnetic fields generated from the magnet and magnetic fields generated from the coil; a spring arranged to support the vibrating body at one thrust-direction side of the vibrating body; and a shaft extending in the thrust direction through the vibrating body, the shaft arranged to allow the vibrating body to slide along the shaft in the thrust direction.

In the present invention, the vibrating body is supported by the spring only at one thrust-direction side thereof. This makes it possible to increase the stroke of the vibrating body. The vibration generator of the present invention includes the shaft arranged to allow the vibrating body to slide along the shaft in the thrust direction. It is therefore possible to prevent the vibrating body from being deflected in a radial direction. This makes it possible to smoothly vibrate the vibrating body in the thrust direction. Since the shaft prevents radial deflection of the vibrating body, it is possible to prevent the vibrating body from making contact with the coil. This makes it possible to prevent disconnection of the coils and damage of the magnet arranged in the vibrating body. With the structure in which the shaft is arranged and in which the vibrating body is supported by the spring only at one thrust-direction side thereof, it is possible to facilitate the assembling of the vibration generator.

The vibrating body of the present vibration generator includes a bearing having a slide hole extending in the thrust direction, the shaft inserted through the slide hole.

In the present invention, the bearing slides along the shaft and the vibrating body vibrates in the thrust direction. This makes it possible to smoothly vibrate the vibrating body in the thrust direction.

With the present vibration generator, the shaft is made of metal and the bearing is made of metal, ceramic or resin.

In the present invention, it is possible to reduce the friction generated between the shaft and the bearing. This makes it possible to smoothly vibrate the vibrating body. Since a certain degree of friction is generated between the shaft and the bearing, it is possible to stop the vibrating body within a short period of time.

With the present vibration generator, the vibrating body is arranged radially inward of the coil, the magnet arranged in an outer peripheral portion of the vibrating body, the coil opposed to the magnet.

In the present invention, it is possible to increase the radius and circumferential length of the coil, eventually increasing the volume of the coil. By increasing the radius and circumferential length of the coil, it becomes possible to widen the region existing radially inward of the coil. This makes it possible to increase the radial dimension of the vibrating body. The magnet arranged in the outer peripheral portion of the vibrating body with an increased radial dimension has an increased volume. This makes it possible to lower the performance of the magnet. It is therefore possible to reduce the cogging force generated during the vibration of the vibrating body.

According to the present invention, the vibrating body is supported by the spring only at one thrust-direction side thereof. This makes it possible to increase the stroke of the vibrating body. Thus, the reduction of the size of the vibration generator is not hindered. Since the vibrating body is supported by the spring only at one thrust-direction side thereof, it becomes possible to assemble the vibration generator with ease. Inasmuch as the shaft prevents deflection of the vibrating body, it is possible to smoothly vibrate the vibrating body. Moreover, it is possible to prevent the vibrating body and the coil from making contact with each other. This makes it possible to prevent disconnection of the coil and damage of the magnet installed in the vibrating body. Since the vibrating body slides along the shaft, it becomes possible to stop the vibration of the vibrating body within a short period of time.

The above and other features, elements, steps, characteristics and advantages of the present invention will become more apparent from the following detailed description of preferred embodiments of the present invention with reference to the attached drawings.

DESCRIPTION OF THE PREFERRED EMBODIMENTS

Figure 1:
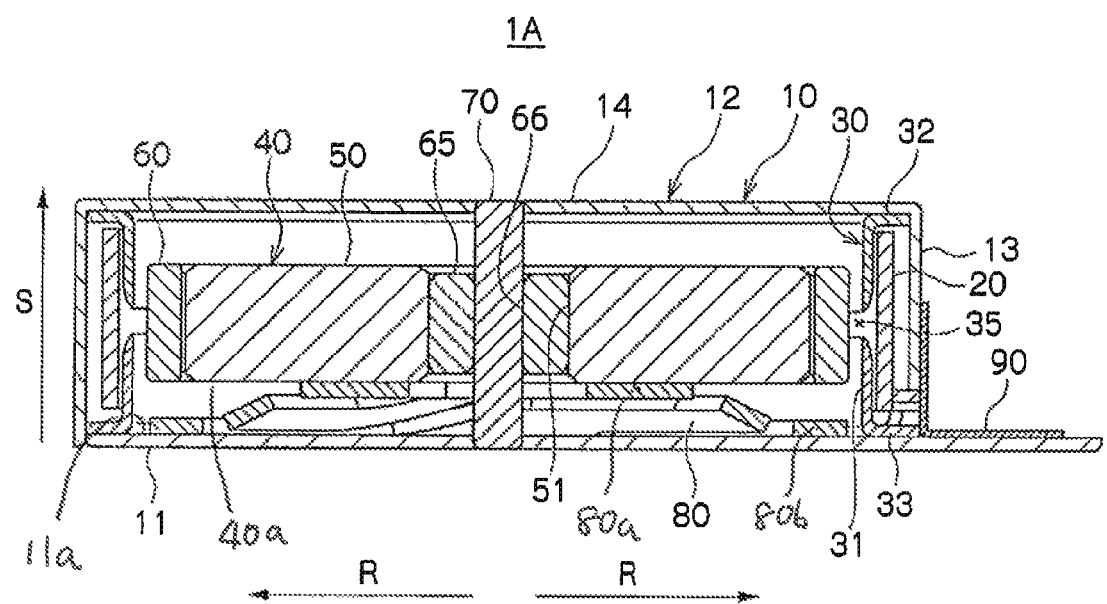
FIG. 1 is a vertical section view showing an internal structure of a vibration generator according to a first preferred embodiment of the present invention.

Preferred embodiments of the present invention will now be described with reference to the accompanying drawings which form a part hereof. The technical scope of the present invention is not limited to the following description and the accompanying drawings.

(Basic Configuration)

A vibration generator 1A, 1B, 1C, 1D or 1E according to the present invention includes: a coil 20, 221, 222, 320 or 420 arranged to generate magnetic fields; a magnet 60, 260, 360 or 460; a weight 50, 250, 350 or 450; a vibrating body 40, 240, 340 or 440 vibrated in a thrust direction by the interaction between the magnetic fields generated from the magnet 60, 260, 360 or 460 and the magnetic fields generated from the coil 20, 221, 222, 320 or 420; a spring 80 or 480 arranged to support the vibrating body 40, 240, 340 or 440 at one thrust-direction side of the vibrating body 40, 240, 340 or 440; and a shaft 70 or 470 extending in the thrust direction through the vibrating body 40, 240, 340 or 440 to allow the vibrating body 40, 240, 340 or 440 to slide along the shaft 70 or 470 in the thrust direction. The vibration generator 1A, 1B, 1C, 1D or 1E further includes a yoke 30, 130, 230, 330, 331, 430 or 435.

In the vibration generator 1A, 1B, 1C, 1D or 1E according to the present invention, the vibrating body 40, 240, 340 or 440 is supported by the spring 80 or 480 only at one thrust-direction side of the vibrating body 40, 240, 340 or 440. It is therefore possible to increase the stroke of the vibrating body 40, 240, 340 or 440. Since the vibrating body 40, 240, 340 or 440 is supported by the spring 80 or 480 only at one thrust-direction side of the vibrating body 40, 240, 340 or 440, it is possible to perform an assembling work with ease. Inasmuch as the shaft 70 or 470 prevents deflection of the vibrating body 40, 240, 340 or 440, it is possible to smoothly vibrate the vibrating body 40, 240, 340 or 440. Moreover, it is possible to prevent the vibrating body 40, 240, 340 or 440 and the coil 20, 221, 222, 320 or 420 from making contact with each other. This makes it possible to prevent disconnection of the coil 20, 221, 222, 320 or 420 and damage of the magnet 60, 260, 360 or 460 installed in the vibrating body 40, 240, 340 or 440. Since the vibrating body 40, 240, 340 or 440 slides along the shaft 70 or 470, it becomes possible to stop the vibration of the vibrating body 40, 240, 340 or 440 within a short period of time.

The vibration generators 1A, 1B, 1C, 1D and 1E can be divided into a vibration generator 1A, 1B, 1C or 1D having an inner magnet structure in which the vibrating body 40, 240, or 340 provided with the magnet 60, 260, or 360 is arranged radially inward of the coil 20, 221, 222, or 320 and a vibration generator 1E having a structure similar to a structure of a speaker. The vibration generators 1A, 1B, 1C and 1D having an inner magnet structure can be divided into a vibration generator 1A or 1B in which the yoke 30 or 130 is arranged near the coil 20 and a vibration generator 1C or 1D in which the yoke 230, 330 or 331 is arranged near the magnet 260 or 360.

The vibration generators 1A and 1B in which the yoke 30 or 130 is arranged near the coil 20 can be divided into two types depending on the kinds of the yoke 30 and 130. The yoke 30 preferably includes an inner peripheral wall 31 covering an inner surface of the coil 20 and a pair of end surface portions 32 and 33 extending from the thrust-direction opposite ends of the inner peripheral wall 31 toward a peripheral wall surface 13 of a case 12. The yoke 130 includes an inner peripheral wall 131 covering the inner circumferential surface of the coil 20, an outer peripheral wall 134 covering the outer circumferential surface of the coil 20, an upper end surface portion 132 arranged near the top surface 14 of the case 12 to cover the portion of the coil 20 facing toward the top surface 14 and a lower end surface portion 133 arranged near an end plate 11 to cover the portion of the coil 20 facing toward the end plate 11.

The vibration generators 1C and 1D in which the yoke 230, 330 or 331 is arranged near the magnet 260 or 360 can be divided into a vibration generator 1C in which the coils 221 and 222 are arranged side by side along the thrust direction and a vibration generator 1D in which all the magnets 360 are arranged along the thrust direction.

The housing 10 has a lower inside surface 11a. The vibrating body 40 has a lower surface 40a. The spring has a first end 80a and a second end 80b. The first end 80a is radially closer than the second end 80b. The first end 80a is fixed to the lower surface 40a of the vibrating body. The second end 80b is fixed to the lower inside surface 11a of the housing. The second end 80b is located radially inside the coil 20.

The respective configurations of the vibration generator will now be described on an embodiment-by-embodiment basis. The term "thrust direction" denotes a height direction of the vibration generator 1A, 1B, 1C, 1D or 1E. The term "radial direction" means a radius direction of the vibration generator 1A, 1B, 1C, 1D or 1E.

First Embodiment

Figure 2:
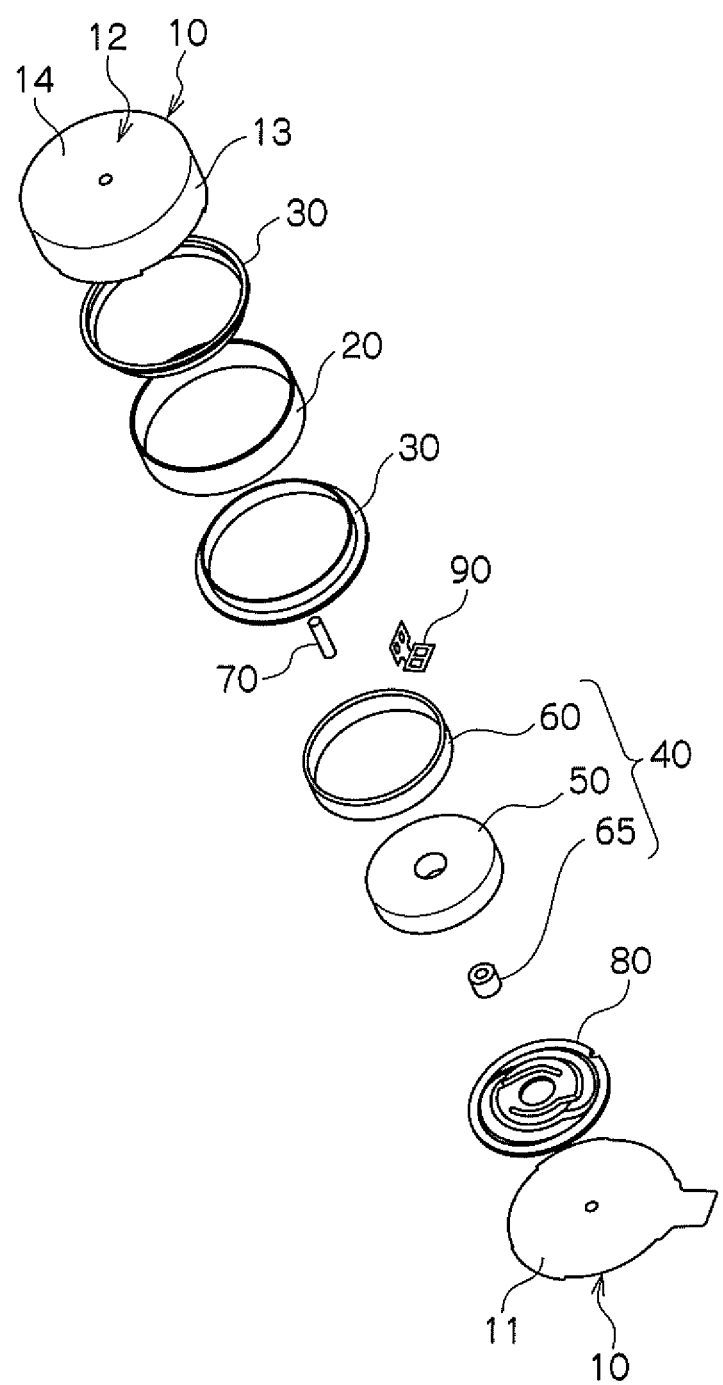
FIG. 2 is an exploded perspective view of the vibration generator shown in FIG. 1.

A vibration generator 1A according to a first preferred embodiment of the present invention will be described in detail with reference to FIGS. 1 and 2. The radius direction of the vibration generator 1A designated by reference symbol R in FIG. 1 is a radial direction. The height direction of the vibration generator 1A designated by reference symbol S in FIG. 1 is a thrust direction.

The vibration generator 1A preferably includes a housing 10 serving as an outer shell. The housing 10 preferably includes an end plate 11 serving as a bottom surface of the vibration generator 1A and a case 12 capped on the end plate 11. The case 12 is one-piece formed by an annular peripheral wall surface 13 surrounding the periphery of the vibration generator 1A and a top surface 14 covering the top portion of the vibration generator 1A. The case 12 is made of a magnetic material.

Within the housing 10, there are accommodated an annular coil 20 arranged to generate magnetic fields, a yoke 30 arranged on an inner circumferential surface of the coil 20 to amplify an electromagnetic force generated by the magnetic fields in cooperation with the coil 20, a vibrating body 40 arranged radially inward of the coil 20, a shaft 70 arranged at a radial center of the vibration generator 1A and a spring 80 arranged to support the vibrating body 40 in the thrust direction.

The coil 20 is arranged inside the peripheral wall surface 13 of the case 12 with a minute gap left between the coil 20 and the peripheral wall surface 13. The coil 20 is formed into an annular shape by winding an element wire. The coil 20 surrounds the periphery of the vibrating body 40 arranged inward of the coil 20. The coil 20 is formed to have a reduced thickness. The thrust-direction dimension of the coil 20 is a little smaller than the thrust-direction dimension of the case 12.

In cooperation with the coil 20, the yoke 30 amplifies the electromagnetic force generated by the magnetic fields. The yoke 30 is formed into an annular shape by a thin magnetic material. The yoke 30 preferably includes an inner peripheral wall 31 covering the inner surface of the coil 20 and a pair of end surface portions 32 and 33 extending from the thrust-direction opposite ends of the inner peripheral wall 31 toward the peripheral wall surface 13 of the case 12. The end surface portions 32 and preferably includes an upper end surface portion 32 arranged near the top surface 14 of the case 12 to extend from the end portion of the inner peripheral wall 31 toward the peripheral wall surface 13 and a lower end surface portion 33 arranged near the end plate 11 to extend from the end portion of the inner peripheral wall 31 toward the peripheral wall surface 13. The tip end of the upper end surface portion 32 and the tip end of the lower end surface portion 33 make contact with the peripheral wall surface 13 of the case 12. An opening portion 35 is formed at the thrust-direction center of the inner peripheral wall 31. The opening portion 35 is formed over the entire circumference of the yoke 30. The upper end surface portion 32 and the lower end surface portion 33 of the yoke 30 are interposed between the end plate 11 and the top surface 14 of the case 12, whereby the yoke 30 is fixed in a specified position.

In the structures of the case 12, the coil 20 and the yoke 30 described above, the yoke 30 and the peripheral wall surface 13 of the case 12 are magnetized with the magnetic fields generated from the coil 20. For that reason, the peripheral wall surface 13 of the case 12 serves as a magnetic circuit. The yoke 30 can be made of thin flat magnetic material. This makes it possible to widen the region positioned radially inward of the yoke 30.

The shaft 70 is arranged at the radial center of the housing 10 to extend in the thrust direction. One axial end of the shaft 70 is arranged in the end plate 11. The other axial end of the shaft 70 is arranged on the top surface 14 of the case 12. The shaft 70 is made of, e.g., metal. The shaft 70 prevents the vibrating body 40 from being deflected in the radial direction when the vibrating body 40 vibrates in the thrust direction.

The vibrating body 40 preferably includes a weight 50, a magnet 60 attached to the outer peripheral portion of the weight 50 and a bearing 65 arranged at the radial center of the weight 50. The vibrating body 40 is vibrated in the thrust direction by the magnetic fields generated from the coil 20 and the magnetic fields generated from the magnet 60.

The weight 50 is formed into a disc shape to have a specified thickness. The thickness of the weight 50 is smaller than the thrust-direction dimension of the yoke 30. The weight 50 is formed to have a desired weight depending on the kinds of portable terminals employing the vibration generator 1A.

The magnet 60 is formed into an annular shape and is fitted to the outer peripheral portion of the weight 50. The thrust-direction dimension of the magnet 60 is smaller than the thrust-direction dimension of the yoke 30. For that reason, the coil 20 and the yoke 30 can appropriately apply a thrust force to the vibrating body 40 even when the vibrating body 40 is moved to a maximum amplitude position. The thrust-direction dimension of the yoke 30 is preferably set equal to or larger than the amplitude of the vibrating body 40.

The outer circumferential surface of the magnet 60 is opposed to the inner peripheral wall 31 of the yoke 30 over the entire circumference. The gap between the outer circumferential surface of the magnet 60 and the inner peripheral wall 31 of the yoke 30 is uniformly formed over the entire circumference. The outer circumferential surface of the magnet 60 is opposed to the inner circumferential surface of the coil 20 across the yoke 30 over the entire circumference with a specified gap left therebetween. As stated above, the magnetic circuit of the vibration generator 1A is formed into an inner magnet structure.

The bearing 65 is inserted into an attachment hole 51 defined at the radial center of the weight 50. The attachment hole 51 is formed to extend through the thickness of the weight 50. The bearing 65 inserted into the attachment hole 51 is formed into a cylindrical shape. A slide hole 66 extending in the thrust direction is defined at the radial center of the bearing 65. The shaft 70 is inserted through the slide hole 66.

When the vibrating body 40 vibrates in the thrust direction, the inner circumferential surface of the slide hole 66 slides along the outer circumferential surface of the shaft 70 in the thrust direction. For that reason, the bearing 65 is required to have low friction with respect to the shaft 70. The structure in which the bearing 65 is arranged on the outer circumferential surface of the shaft 70 needs to have a function of stopping the vibrating body 40 within a short period of time. For that reason, the bearing 65 is made of, e.g., metal, ceramic or resin. If the fitting of the shaft 70 and the slide hole 66 is too tight, the bearing 65 cannot smoothly slide along the shaft 70. In contrast, if the fitting of the shaft 70 and the slide hole 66 is too loose, the shaft 70 cannot keep the vibrating body 40 horizontal. Thus, the vibrating body 40 vibrates in the thrust direction while deflecting in the radial direction. In view of this, the inner diameter of the slide hole 66 defined in the bearing 65 and the outer diameter of the shaft 70 are suitably set to ensure that the vibrating body 40 can smoothly vibrate.

The vibrating body 40 is supported in the thrust direction by the spring 80 attached to the end plate 11.

The spring 80 is formed by spirally winding a flat spring material. The spring 80 is a volute spring having a truncated conical contour. The spring 80 is formed such that the winding radius of the spring material is gradually decreased as the spring material extends from the radial outer side toward the center and such that the central portion of the spring 80 protrudes in the thrust direction. The radial outer portion of the spring 80 is fixed to the end plate 11. The central portion of the spring 80 is arranged on the vibrating body 40. The supporting structure of the vibrating body 40 is a cantilever structure in which the vibrating body 40 is supported only at the side of the end plate 11 by the spring 80.

The degree of precision of the spring 80 is an important factor in causing the vibrating body 40 to vibrate with no deflection in the radial direction. For that reason, the spring 80 having a high degree of precision is generally used in order to prevent deflection of the vibrating body 40. However, the vibration generator 1A is provided with the shaft 70 along which the vibrating body 40 slides. Therefore, even if a spring having a high degree of precision is not used, the vibrating body 40 can smoothly vibrate in the thrust direction with no radial deflection. In the structure provided with the shaft 70, it is therefore possible to select a spring having a low degree of precision. This helps reduce the cost.

When supported by the spring 80, the vibrating body 40 is positioned at the amplitude center in the thrust direction. If the vibrating body 40 is supported by the spring 80, the thrust-direction center of the magnet 60 comes into alignment with the position of the opening portion 35 formed in the yoke 30.

The supporting structure of the vibrating body 40 is a cantilever structure in which the vibrating body 40 is supported by the spring 80 only at the side of the end plate 11. Use of the cantilever structure makes it possible to widen the region existing between the vibrating body 40 and the case 12 in the thrust direction. For that reason, the cantilever structure can increase the amplitude stroke of the vibrating body 40 without having to increase the thrust-direction dimension of the vibration generator 1A. As compared with a straddling lever structure, the cantilever structure makes it easy to assemble the vibration generator 1A.

Figure 3:
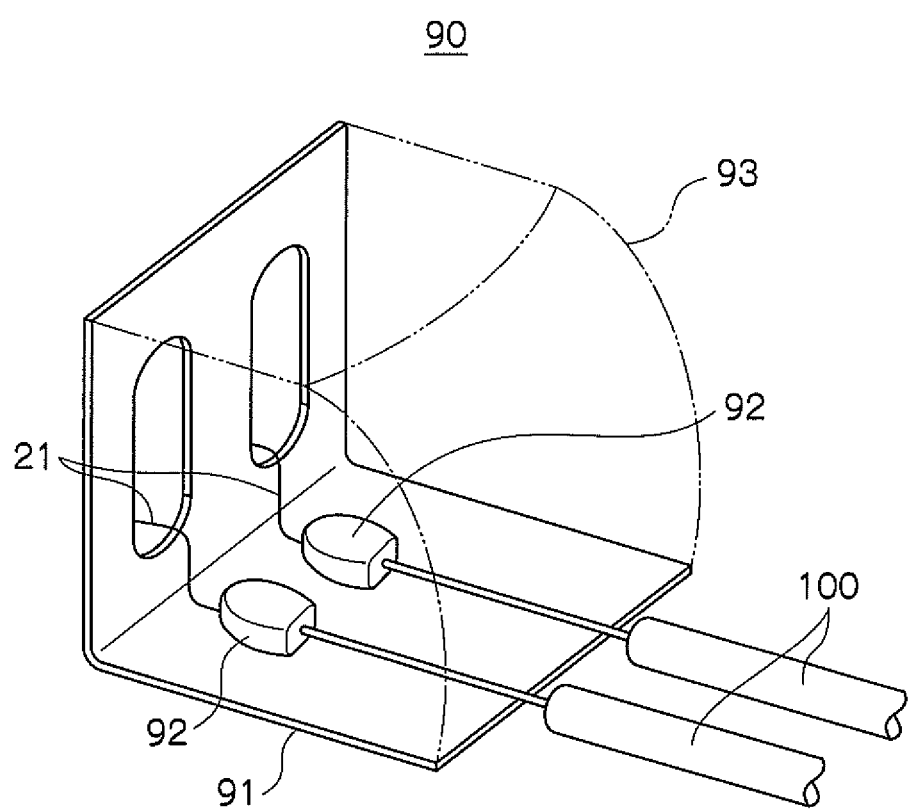
FIG. 3 is a perspective view schematically showing a connecting portion.

As shown in FIG. 3, the vibration generator 1A includes a connecting portion 90 arranged outside the housing 10. The connecting portion 90 is a portion where two lead wires 21 extending from the coil 20 are soldered and connected to the wiring lines 100 extending from a power source. The connecting portion 90 preferably includes a FPC (flexible printed circuit) 91 and a cover 93 covering the FPC 91. The FPC 91 is a circuit board and is preferably composed of a film-shaped insulating body having a thickness of from about 12 μm to about 50 μm, an adhesive agent layer formed on the insulating body and a conductive foil formed on the adhesive agent layer and having a thickness of from about 12 μm to about 50 μm. The FPC 91 preferably includes solder portions 92. The region of the surface of the FPC 91 other than the solder portions 92 is covered with the insulating body. For the sake of easier description, only the solder portions 92 are shown in FIG. 3.

The lead wires 21 of the coil 20 pass through the holes joining the inside and outside of the case 12 and extend to the FPC 91. The two lead wires 21 extending from the coil 20 and the wiring lines 100 extending from the power source for supplying an electric current to the coil 20 are connected to each other by the solder portions 92 of the FPC 91.

In the vibration generator 1A configured as above, if an electric current flows through the coil 20, magnetic fields are generated in the coil 20 and the yoke 30. A force for moving the vibrating body 40 in the thrust direction is applied to the vibrating body 40 by the magnetic fields generated in the coil 20 and the yoke 30 and by the magnetic fields generated in the magnet 60 attached to the vibrating body 40. Since the vibrating body 40 is supported by the spring 80 in the thrust direction, the vibrating body 40 is vibrated in the thrust direction by the force received from the magnetic fields and by the force received from the spring 80. When the vibrating body 40 vibrates in the thrust direction, the shaft 70 prevents radial deflection of the vibrating body 40. Thus, the vibrating body 40 can smoothly vibrate in the thrust direction.

As the vibrating body 40 resonates, the vibration generator 1A can effectively notify a user of arrival of an incoming call. For that reason, the vibration generator 1A is preferably configured such that the vibrating body 40 can resonate. The value of an electric current flowing through the coil 20, the weight of the weight 50 arranged within the vibration generator 1A, the magnetic force of the magnet 60 fitted to the weight 50 and the spring constant of the spring 80 are set in advance so that the vibrating body 40 can resonate appropriately.

If the vibrating body 40 is vibrated in the thrust-direction by the magnetic fields generated from the coil 20, the yoke 30 and the magnet 60, the magnet 60 arranged in the vibrating body 40 tends to be attracted toward a specified position of the coil 20 by a cogging force. The cogging force becomes conspicuous in case where the performance of the magnet 60 is high. For that reason, it is effective to use a low-performance magnet in order to reduce the cogging force.

The magnetic circuit of the vibration generator 1A is formed into an inner magnet structure. Use of the inner magnet structure makes it possible to widen the region existing radially inward of the yoke 30. For that reason, the inner magnet structure can increase the radial dimension of the vibrating body 40. The increase in the radial dimension of the vibrating body 40 leads to an increase in the volume of the magnet 60 arranged in the outer peripheral portion of the weight 50. The magnet 60 having an increased volume can generate magnetic fields over a broader range. Therefore, even if the performance of the magnet 60 is low, it is possible to reduce the cogging force and to sufficiently vibrate the vibrating body 40. In case of the inner magnet structure, it is also possible to use a coil 20 having an increased volume. This makes it possible to use a low-performance magnet 60.

If an electric current flowing through the coil 20 is cut off, the thrust-direction force acting on the vibrating body 40 ceases to exist and the vibrating body 40 stops. Since the bearing 65 of the vibrating body 40 slides along the outer circumferential surface of the shaft 70, the vibrating body 40 is stopped within a short period of time by the friction generated between the bearing 65 and the shaft 70.

There may be a case that a user drops a portable terminal having the vibration generator 1A installed therein. Even in this case, the shaft 70 prevents the vibrating body 40 from being deflected in the radial direction. Therefore, even if the portable terminal is dropped, the vibrating body 40 does not collide with the yoke 30 and the yoke 30 does not interfere with the coil 20. This makes it possible to prevent disconnection of the coil 20 and damage of the magnet 60.

Second Embodiment

Figure 4:
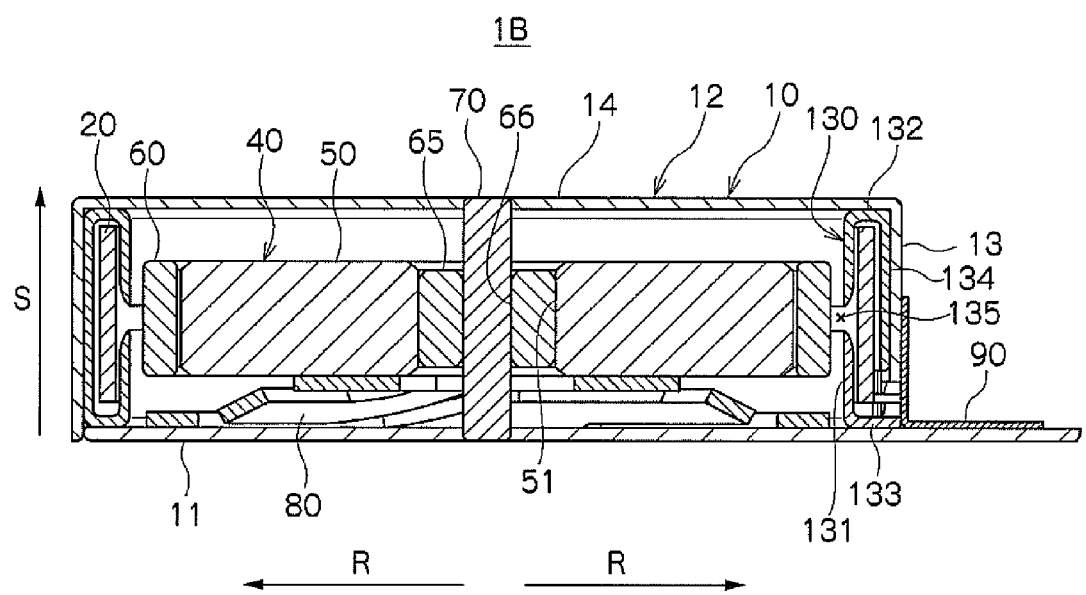
FIG. 4 is a vertical section view showing an internal structure of a vibration generator according to a second preferred embodiment of the present invention.

A vibration generator 1B according to a second preferred embodiment of the present invention will be described in detail with reference to FIG. 4. The vibration generator 1B of the second embodiment differs from the vibration generator 1A of the first embodiment only in terms of the configuration of a yoke 130 and remains the same as the vibration generator 1A of the first embodiment in other configurations. Therefore, the same configurations as those of the vibration generator 1A of the first embodiment will be designated by like reference symbols and will be described just briefly. Detailed description will be made on only the differing configurations. The radius direction of the vibration generator 1B designated by reference symbol R in FIG. 4 is a radial direction. The height direction of the vibration generator 1B designated by reference symbol S in FIG. 4 is a thrust direction.

The vibration generator 1B preferably includes a housing 10 composed of an end plate 11 and a case 12. The case 12 is one-piece formed by an annular peripheral wall surface 13 surrounding the periphery of the vibration generator 1B and a top surface 14 covering the top portion of the vibration generator 1B. The case 12 is made of a non-magnetic material.

Within the housing 10, there are accommodated an annular coil 20 arranged to generate magnetic fields, a yoke 130 arranged to cover an inner circumferential surface, an outer circumferential surface, an upper end portion and a lower end portion of the coil 20 and to amplify an electromagnetic force generated by the magnetic fields in cooperation with the coil 20, a vibrating body 40 arranged radially inward of the coil 20, a shaft 70 arranged at a radial center of the vibration generator 1B and a spring 80 arranged to support the vibrating body 40 in the thrust direction.

The coil 20 is formed into an annular shape and is arranged inside the peripheral wall surface 13 of the case 12 with a minute gap left between the coil 20 and the peripheral wall surface 13. The coil 20 is formed to have a reduced thickness. The thrust-direction dimension of the coil 20 is a little smaller than the thrust-direction dimension of the case 12.

The yoke 130 is made of a thin magnetic material. In cooperation with the coil 20, the yoke 30 amplifies the electromagnetic force generated by the magnetic fields. The yoke 130 is formed to have an annular contour. The yoke 130 preferably includes an inner peripheral wall 131 covering the inner circumferential surface of the coil 20, an outer peripheral wall 134 covering the outer circumferential surface of the coil 20, an upper end surface portion 132 arranged near the top surface 14 of the case 12 to cover the portion of the coil 20 facing toward the top surface 14 and a lower end surface portion 133 arranged near the end plate 11 to cover the portion of the coil 20 facing toward the end plate 11. An opening portion 135 interconnecting a radial inner side and a radial outer side of the inner peripheral wall 131 is formed at the thrust-direction center of the inner peripheral wall 131. The opening portion 135 is formed over the entire circumference of the yoke 130. The upper end surface portion 132 and the lower end surface portion 133 of the yoke 130 are interposed between the end plate 11 and the top surface 14 of the case 12, whereby the yoke 130 is fixed in a specified position.

Since the coil 20 and the yoke 130 are configured as above, the yoke 130 is formed into a compact shape by a thin flat magnetic material.

The shaft 70 is arranged at the radial center. The axial direction of the shaft 70 extends in the thrust direction. The shaft 70 prevents radial deflection of vibrating body 40 when the vibrating body 40 vibrates in the thrust direction.

The vibrating body 40 preferably includes a weight 50, a magnet 60 arranged in the outer peripheral portion of the weight 50 and a bearing 65 arranged at the radial center of the weight 50. The weight 50 is formed into a disc shape to have a specified thickness. The magnet 60 is formed into an annular shape and is fitted to the outer peripheral portion of the weight 50. The thrust-direction dimension of the magnet 60 is smaller than the thrust-direction dimension of the yoke 130. An attachment hole 51 is defined at the radial center of the weight 50. The bearing 65 is fitted into the attachment hole 51. A slide hole 66 extending in a sliding direction is defined at the radial center of the bearing 65. The shaft 70 is inserted through the slide hole 66.

The spring 80 is formed by spirally winding a flat spring material. The spring 80 is a volute spring having a truncated conical contour. The radial outer portion of the spring 80 is fixed to the end plate 11. The central portion of the spring 80 is arranged on the vibrating body 40. The supporting structure of the vibrating body 40 is a cantilever structure in which the vibrating body 40 is supported only at the side of the end plate 11 by the spring 80.

When supported by the spring 80, the vibrating body 40 is positioned at the amplitude center in the thrust direction. If the vibrating body 40 is supported by the spring 80, the thrust-direction center of the magnet 60 comes into alignment with the position of the opening portion 135 formed in the yoke 130.

A connecting portion 90 is arranged outside the housing 10 of the vibration generator 1B (see FIG. 3).

Third Embodiment

Figure 5:
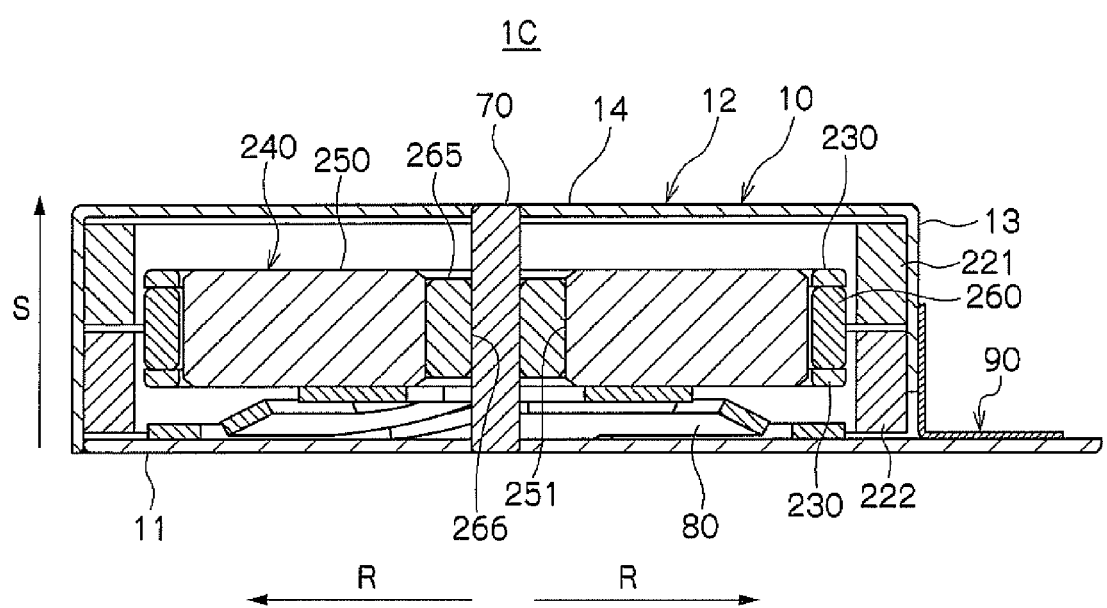
FIG. 5 is a vertical section view showing an internal structure of a vibration generator according to a third preferred embodiment of the present invention.

A vibration generator 1C according to a third preferred embodiment of the present invention will be described in detail with reference to FIG. 5. The same configurations of the vibration generator 1C of the third embodiment as those of the vibration generator 1A of the first embodiment will be designated by like reference symbols with no detailed description made thereon. Detailed description will be made on only the differing configurations. The radius direction of the vibration generator 1C designated by reference symbol R in FIG. 5 is a radial direction. The height direction of the vibration generator 1C designated by reference symbol S in FIG. 5 is a thrust direction.

The vibration generator 1C preferably includes a housing 10 composed of an end plate 11 and a case 12 capped on the end plate 11. The case 12 is one-piece formed by an annular peripheral wall surface 13 surrounding the periphery of the vibration generator 1C and a top surface 14 covering the top portion of the vibration generator 1C.

Within the housing 10, there are accommodated two annular coils 221 and 222 arranged to generate magnetic fields, a vibrating body 240 arranged radially inward of the coils 221 and 222, a shaft 70 arranged at the radial center of the vibration generator 1C and a spring 80 arranged to support the vibrating body 240 in the thrust direction.

Each of the coils 221 and 222 is formed in an annular shape by winding an element wire. The coils 221 and 222 are arranged side by side in the thrust direction. The outer circumferential surfaces of the coils 221 and 222 make close contact with the peripheral wall surface 13 of the case 12. The coil 221 arranged at the side of the case 12 is opposite in the element wire winding direction from the coil 222 arranged at the side of the end plate 11. The coils 221 and 222 surround the periphery of the vibrating body 240 arranged inside thereof.

The shaft 70 is arranged at the radial center of the housing 10. The axial direction of the shaft 70 extends in the thrust direction. On axial end of the shaft 70 is arranged in the end plate 11. The other axial end of the shaft 70 is arranged on the top surface 14 of the case 12. The shaft 70 prevents radial deflection of the vibrating body 240 when the vibrating body 240 vibrates in the thrust direction.

The vibrating body 240 preferably includes a weight 250, a magnet 260 arranged in the outer peripheral portion of the weight 250 and a bearing 265 arranged at the radial center of the weight 250. A pair of yokes 230 for causing the magnetic fields of the magnet 260 to converge is arranged at the thrust-direction opposite sides of the magnet 260. The vibrating body 240 is vibrated in the thrust direction by the interaction of the magnetic fields generated from the coils 221 and 222 and the magnetic fields generated from the magnet 260.

The weight 250 is formed into a disc shape to have a specified thickness. The thickness of the weight 250 is smaller than the sum of the thrust-direction dimensions of the coils 221 and 222. The weight 250 is formed to have a desired weight depending on the kinds of portable terminals employing the vibration generator 1C.

The magnet 260 is formed into an annular shape. The thrust-direction dimension of the magnet 260 is smaller than the thrust-direction dimension of the weight 250. The magnet 260 is fitted to the outer peripheral portion of the weight 250 at the thrust-direction center of the weight 250. The outer circumferential surface of the magnet 260 is opposed to the inner circumferential surfaces of the coils 221 and 222. The gap between the magnet 260 and the coils 221 and 222 remains constant over the entire circumference.

Each of the yokes 230 is formed into an annular shape by a magnetic material. The radial dimension of each of the yokes 230 is equal to or substantially equal to the thickness of the magnet 260. For that reason, the outer peripheral portions of the yokes 230 are flush with or substantially flush with the outer circumferential surface of the magnet 260. The sum of the thrust-direction dimensions of the yokes 230 and the thrust-direction dimension of the magnet 260 is equal to or substantially equal to the thrust-direction dimension of the weight 250.

The magnetic circuit of the vibration generator 1C is formed into an inner magnetic structure in which the magnet 260 and the yokes 230 are arranged radially inward of the coils 221 and 222.

The thrust-direction dimension of the weight 250 is smaller than the sum of the thrust-direction dimensions of the coils 221 and 222. The thrust-direction dimension of the magnet 260 is smaller than the thrust-direction dimension of the weight 250. Therefore, the thrust-direction dimension of the magnet 260 is smaller than the sum of the thrust-direction dimensions of the coils 221 and 222. If the thrust-direction dimension of the magnet 260 is smaller than the sum of the thrust-direction dimensions of the coils 221 and 222, the coils 221 and 222 can appropriately apply a thrust force to the vibrating body 240 even when the vibrating body 240 is moved to a maximum amplitude position.

An attachment hole 251 is defined at the radial center of the weight 250 to extend through the weight 250. The bearing 265 is fitted into the attachment hole 251. The bearing 265 is formed into a cylindrical shape. A slide hole 266 extending in the thrust direction is defined at the radial center of the bearing 265. The shaft 70 is inserted through the slide hole 266.

The spring 80 is formed by spirally winding a flat spring material. The spring 80 is a volute spring having a truncated conical contour. The radial outer portion of the spring 80 is fixed to the end plate 11. The central portion of the spring 80 is arranged on the vibrating body 240. The supporting structure of the vibrating body 240 is a cantilever structure in which the vibrating body 240 is supported only at the side of the end plate 11 by the spring 80.

When supported by the spring 80, the vibrating body 240 is positioned at the amplitude center in the thrust direction. If the vibrating body 240 is supported by the spring 80, the thrust-direction center of the magnet 260 comes into alignment with the border line between the coils 221 and 222.

A connecting portion 90 is arranged outside the housing 10 of the vibration generator 1C (see FIG. 3).

Fourth Embodiment

Figure 6:
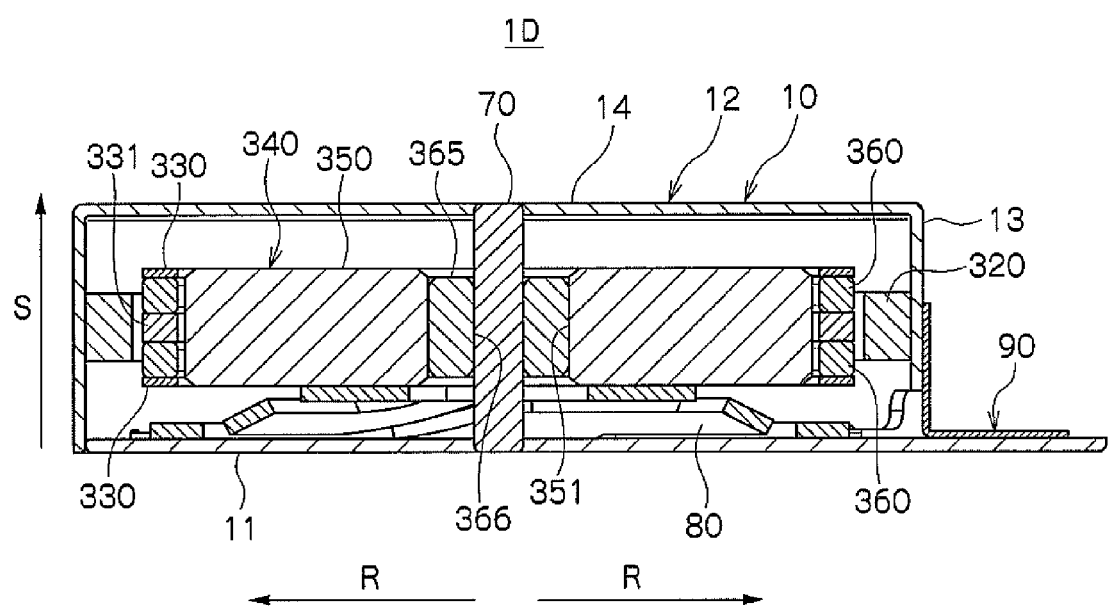
FIG. 6 is a vertical section view showing an internal structure of a vibration generator according to a fourth preferred embodiment of the present invention.

A vibration generator 1D according to a fourth preferred embodiment of the present invention will be described in detail with reference to FIG. 6. The same configurations of the vibration generator 1D of the fourth embodiment as those of the vibration generator 1A of the first embodiment will be designated by like reference symbols with no detailed description made thereon. Detailed description will be made on only the differing configurations. The radius direction of the vibration generator 1D designated by reference symbol R in FIG. 6 is a radial direction. The height direction of the vibration generator 1D designated by reference symbol S in FIG. 6 is a thrust direction.

The vibration generator 1D preferably includes a housing 10 composed of an end plate 11 and a case 12 capped on the end plate 11. The case 12 is one-piece formed by an annular peripheral wall surface 13 surrounding the periphery of the vibration generator 1D and a top surface 14 covering the top portion of the vibration generator 1D.

Within the housing 10, there are accommodated an annular coil 320 arranged to generate magnetic fields, a vibrating body 340 arranged radially inward of the coil 320, a shaft 70 arranged at a radial center of the vibration generator 1D and a spring 80 arranged to support the vibrating body 340 in the thrust direction.

The coil 320 is formed by annularly winding an element wire. The thrust-direction dimension of the coil 320 is smaller than the thrust-direction dimension of the vibrating body 340. The radial dimension of the coil 320 is equal to or a little smaller than the thrust-direction dimension of the coil 320. The coil 320 is positioned at the thrust-direction center of the case 12 in a state that the outer circumferential surface of the coil 320 makes close contact with the peripheral wall surface 13 of the case 12.

The shaft 70 is arranged at the radial center of the housing 10. The axial direction of the shaft 70 extends in the thrust direction. The shaft 70 prevents radial deflection of the vibrating body 340 when the vibrating body 340 vibrates in the thrust direction.

The vibrating body 340 preferably includes a weight 350, two magnets 360 attached to the outer peripheral portion of the weight 350 and a bearing 365 arranged at the radial center of the weight 350. Three yokes 330, 330 and 331 for causing the magnetic fields of the magnets 360 to converge are arranged in the outer peripheral portion of the weight 350. The vibrating body 340 is vibrated in the thrust direction by the interaction of the magnetic fields generated from the coil 320 and the magnetic fields generated from the magnets 360.

The weight 350 is formed into a disc shape to have a specified thickness. The thickness of the weight 350 is larger than the thrust-direction dimension of the coil 320. The weight 350 is formed to have a desired weight depending on the kinds of portable terminals employing the vibration generator 1D.

Each of the magnets 360 is formed into an annular shape. The magnets 360 are arranged side by side in the thrust direction and are fitted to the outer peripheral portion of the weight 350. The outer circumferential surfaces of the magnets 360 are opposed to the inner circumferential surface of the coil 320. The gap between the magnets 360 and the coil 320 remains constant over the entire circumference. The magnetic circuit of the vibration generator 1D is formed into an inner magnetic structure in which the magnets 360 are arranged radially inward of the coil 320.

Each of the three yokes 330, 330 and 331 is formed into an annular shape by a magnetic material. The thrust-direction dimensions of the yokes 330, 330 and 331 are set such that the yoke 331 has an increased thickness and the yokes 330 and 330 have a reduced thickness. The yoke 331 having an increased thickness is interposed between the two magnets 360. One of the yokes 330 having a reduced thickness is fitted to the outer peripheral portion of the weight 350 in a position near the end surface of the weight 350 facing toward the case 12. The other yoke 330 having a reduced thickness is fitted to the outer peripheral portion of the weight 350 in a position near the end surface of the weight 350 facing toward the end plate 11. The yokes 330, 330 and 331 and the magnets 360 are arranged in an order of the yoke 330, the magnet 360, the yoke 331, the magnet 360 and the yoke 330 from the side of the case 12. The sum of the thrust-direction dimensions of the yokes 330 and 331 and the magnets 360 is equal to or substantially equal to the thrust-direction dimension of the weight 350.

The bearing 365 is fitted into an attachment hole 351 defined at the radial center of the weight 350. The attachment hole 351 is formed to extend through the weight 350 in the thrust direction. The bearing 365 is formed into a cylindrical shape. A slide hole 366 extending in the thrust direction is defined at the radial center of the bearing 365. The shaft 70 is inserted through the slide hole 366. The bearing 365 is made of, e.g., metal, ceramic or resin.

The spring 80 is formed by spirally winding a flat spring material. The spring 80 is a volute spring having a truncated conical contour. The radial outer portion of the spring 80 is fixed to the end plate 11. The central portion of the spring 80 is arranged on the vibrating body 340. The supporting structure of the vibrating body 340 is a cantilever structure in which the vibrating body 340 is supported only at the side of the end plate 11 by the spring 80.

When supported by the spring 80, the vibrating body 340 is positioned at the amplitude center in the thrust direction. If the vibrating body 340 is supported by the spring 80, the thrust-direction center of the vibrating body 340 comes into alignment with the thrust-direction center of the coil 320. In other words, the yoke 331 arranged between the magnets 360 and 360 is opposed to the thrust-direction center of the coil 320.

A connecting portion 90 is arranged outside the housing 10 of the vibration generator 1D (see FIG. 3).

Fifth Embodiment

Figure 7:
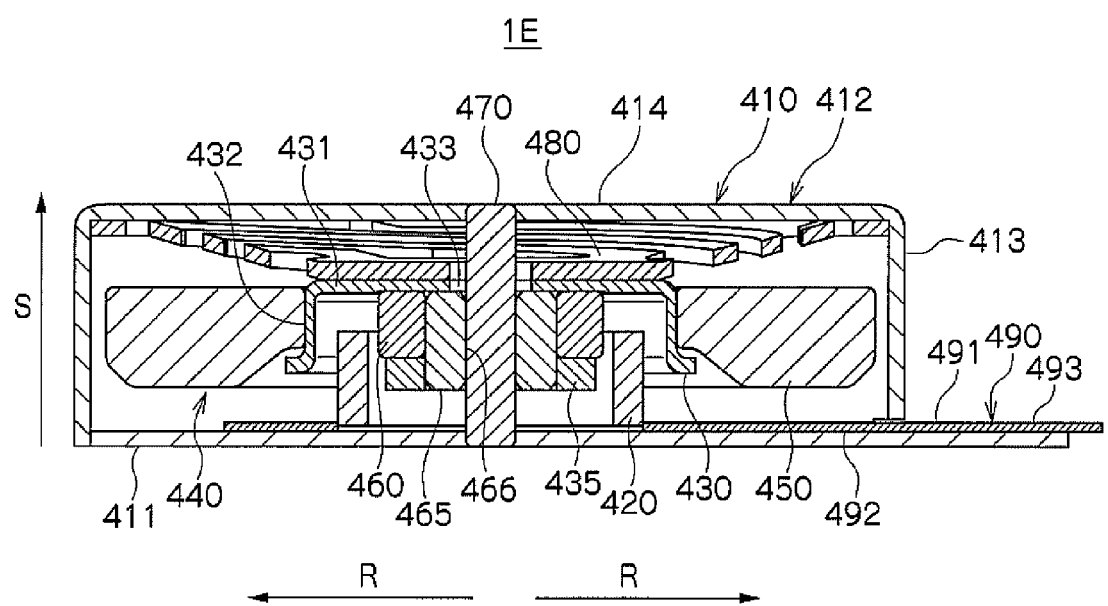
FIG. 7 is a vertical section view showing an internal structure of a vibration generator according to a fifth preferred embodiment of the present invention.

A vibration generator 1E according to a fifth preferred embodiment of the present invention will be described in detail with reference to FIG. 7. The radius direction of the vibration generator 1E designated by reference symbol R in FIG. 7 is a radial direction. The height direction of the vibration generator 1E designated by reference symbol S in FIG. 7 is a thrust direction.

The vibration generator 1E preferably includes a housing 410 serving as an outer shell. The housing 410 preferably includes an end plate 411 and a case 412 capped on the end plate 411. The case 412 is one-piece formed by an annular peripheral wall surface 413 surrounding the periphery of the vibration generator 1E and a top surface 414 covering the top portion of the vibration generator 1E.

The vibration generator 1E has an internal structure similar to the structure of a speaker. Within the housing 410, there are accommodated an annular coil 420 arranged to generate magnetic fields, a vibrating body 440 which includes a weight 450, a magnet 460 and two yokes 430 and 435 for causing the magnetic fields of the magnet 460 to converge, a shaft 470 arranged at the radial center of the vibration generator 1E and a spring 480 arranged to support the vibrating body 440 in the thrust direction.

The coil 420 is formed by annularly winding an element wire. The coil 420 has a radius equal to about ⅓ to ¼ of a radius of the case 412. In addition, the coil 420 has an axial length equal to about ½ of a height of the case 412. One axial end of the coil 420 is fixed to the surface of the end plate 411. The coil 420 is arranged to surround the central region of the vibration generator 1E.

The shaft 470 is arranged at the radial center of the housing 410. The axial direction of the shaft 470 extends in the thrust direction. One axial end of the shaft 470 is arranged in the end plate 411. The other axial end of the shaft 470 is arranged on the top surface 414 of the case 412. The shaft 470 prevents radial deflection of the vibrating body 440 when the vibrating body 440 vibrates in the thrust direction.

The vibrating body 440 preferably includes a substantially doughnut-shaped weight 450, an outer yoke 430 arranged inside the weight 450, a bearing 465 arranged at the center of the outer yoke 430, a magnet 460 arranged in the outer peripheral portion of the bearing 465 and an inner yoke 435 arranged below the magnet 460 in the outer peripheral portion of the bearing 465. The vibrating body 440 is vibrated in the thrust direction by the interaction of the magnetic fields generated from the coil 420 and the magnetic fields generated from the magnet 460.

The doughnut-shaped weight 450 is formed to have a specified thickness. The lower surface of the weight 450 is subjected to chamfering such that the outer peripheral portion and the inner peripheral portion thereof are obliquely cut away. The weight 450 is formed to have a desired weight depending on the kinds of portable terminals employing the vibration generator 1E.

The outer yoke 430 is one-piece formed by a circular ceiling surface 431 and a side peripheral surface 432 extending from the ceiling surface 431 toward the end plate 411. The outer yoke 430 is fixed to the weight 450 by fitting the outer peripheral portion of the side peripheral surface 432 to the inner peripheral portion of the weight 450. The radial center of the outer yoke 430 is aligned with the center of the vibration generator 1E. A hole 433 is defined at the center of the ceiling surface 431 to extend through the ceiling surface 431. The shaft 470 is inserted through the hole 433. The ceiling surface 431 of the outer yoke 430 protrudes toward the top surface 414 of the case 412 beyond the surface of the weight 450 facing toward the top surface 414.

The bearing 465 is formed into a cylindrical shape. A slide hole 466 extending in the thrust direction is defined at the radial center of the bearing 465. The radial center of the bearing 465 is aligned with the center of the vibration generator 1E. One axial end of the bearing 465 is fixed to a rear side of the ceiling surface 431 of the outer yoke 430. The shaft 470 is inserted through the slide hole 466 of the bearing 465. The inner circumferential surface of the slide hole 466 slides along the outer circumferential surface of the shaft 470 in the thrust direction when the vibrating body 440 vibrates in the thrust direction. The vibrating body 440 is stopped within a short period of time by the friction generated between the bearing 465 and the shaft 470. For that reason, the bearing 465 is made of, e.g., metal, ceramic or resin. The shaft 470 is made of, e.g., metal. If the fitting between the shaft 470 and the slide hole 466 is too tight, the bearing 465 cannot smoothly slide along the shaft 470. In contrast, if the fitting between the shaft 470 and the slide hole 466 is too loose, the shaft 470 cannot keep the vibrating body 440 horizontal. Thus, the vibrating body 440 vibrates in the thrust direction while deflecting in the radial direction. In view of this, the inner diameter of the slide hole 466 defined in the bearing 465 and the outer diameter of the shaft 470 are suitably set to ensure that the vibrating body 440 can smoothly vibrate.

The magnet 460 is formed into an annular shape. The magnet 460 is fitted to the outer peripheral portion of the bearing 465. One axial end of the magnet 460 is fixed to the rear side of the ceiling surface 431 of the outer yoke 430. A space exists between the magnet 460 and the side peripheral surface 432 of the outer yoke 430. The coil 420 is arranged in the space existing between the magnet 460 and the side peripheral surface 432 of the outer yoke 430. The thrust-direction dimension of the magnet 460 is smaller than the thrust-direction dimension of the bearing 465. The inner yoke 435 is installed on the bearing 465 in a region between the magnet 460 and the end plate 411.

The inner yoke 435 is formed into a doughnut shape. One thickness-direction end surface of the inner yoke 435 makes contact with the end surface of the magnet 460 facing toward the end plate 411. The inner circumferential surface of the inner yoke 435 is fitted and fixed to the outer circumferential surface of the bearing 465. The outer circumferential surface of the inner yoke 435 is opposed to the inner circumferential surface of the coil 420 with a specified gap left therebetween.

The ceiling surface 431 of the outer yoke 430 makes contact with the magnet 460. The side peripheral surface 432 of the outer yoke 430 is arranged outside the coil 420 with a specified gap left between the side peripheral surface 432 and the coil 420. One end surface of the inner yoke 435 makes contact with the magnet 460. The outer circumferential surface of the inner yoke 435 is arranged in a spaced-apart relationship with the inner circumferential surface of the coil 420. Such arrangement of the outer yoke 430 and the inner yoke 435 causes the magnetic fields of the magnet 460 to converge.

The vibrating body 440 is supported in the thrust direction by the spring 480 arranged on the top surface 414 of the case 412.

The spring 480 is formed by spirally winding a flat spring material. The spring 480 is a volute spring having a truncated conical contour. The winding diameter of the spring 480 is gradually decreased as the spring 480 extends from the radial outer portion toward the central portion thereof. The central portion of the spring 480 protrudes in the thrust direction. The radial outer portion of the spring 480 is fixed to the top surface 414 of the case 412. The central portion of the spring 480 is arranged on the ceiling surface 431 of the outer yoke 430.

The supporting structure of the vibrating body 440 is a cantilever structure in which the vibrating body 440 is supported by the spring 480 only at the side of the case 412. Use of the cantilever structure makes it possible to widen the region existing between the vibrating body 440 and the end plate 411 in the thrust direction. For that reason, the cantilever structure can increase the amplitude stroke of the vibrating body 440 without having to increase the thrust-direction dimension of the vibration generator 1E.

If the vibrating body 440 is supported by the spring 480, the vibrating body 440 is positioned at the amplitude center in the thrust direction.

As shown in FIG. 7, the vibration generator 1E preferably includes a connecting portion 490. The connecting portion 490 is a portion where lead wires (not shown) extending from the coil 420 are soldered and connected to wiring lines extending from a power source. The connecting portion 490 is formed of a FPC 491 having a flat shape and is arranged on the surface of the end plate 411. The connecting portion 490 preferably includes a region 492 arranged inside the housing 410 and a region 493 extending outward from the peripheral wall surface 413 of the case 412. The coil 420 extends through a circular hole defined in the region 492 arranged inside the housing 410. The lead wires of the coil 420 and the wiring lines of the power source are soldered to each other in the region 493 extending outward from the peripheral wall surface 413. The connecting portion 490 is provided with a cover (not shown) covering the region 493 extending outward from the peripheral wall surface 413.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration generator, comprising:
   a housing comprising a case having a peripheral wall surface, the housing having a lower inside surface;
   a coil arranged to generate magnetic fields, the coil facing the peripheral wall surface;
   a vibrating body including a magnet and a weight, the magnet arranged at a radially outward of the weight such that the magnet is opposed to the coil, the vibrating body arranged to be vibrated in a thrust direction by an interaction of magnetic fields generated from the magnet and magnetic fields generated from the coil, the vibrating body having a lower surface;
   a spring arranged to support the vibrating body only at one thrust-direction side of the vibrating body, the spring having a first end and a second end, the first end being radially closer than the second end, the first end being fixed to the lower surface of the vibrating body, the second end being fixed to the lower inside surface of the housing, the second end being located radially inside the coil; and
   a shaft extending in the thrust direction through the vibrating body, the shaft arranged to allow the vibrating body to slide along the shaft in the thrust direction.

2. The vibration generator of claim 1, wherein the vibrating body includes a bearing having a slide hole extending in the thrust direction, the shaft inserted through the slide hole.

3. The vibration generator of claim 2, wherein the shaft is made of metal and the bearing is made of metal, ceramic or resin.

4. The vibration generator of claim 2, wherein the vibrating body is arranged radially inward of the coil, the magnet arranged in an outer peripheral portion of the vibrating body, the coil opposed to the magnet.

5. The vibration generator of claim 1, wherein the vibrating body is arranged radially inward of the coil, the magnet arranged in an outer peripheral portion of the vibrating body, the coil opposed to the magnet.

6. The vibration generator of claim 1, wherein the vibrating body, the magnet and the coil are aligned in the order along a radial direction from the shaft.

7. The vibration generator of claim 1, wherein the peripheral wall surface of the case is an annular shape.

8. The vibration generator of claim 1, wherein the magnet is located inward the coil.

* * * * *